United States Patent [19]

Wilber

[11] Patent Number: 5,333,152
[45] Date of Patent: Jul. 26, 1994

[54] ELECTRONIC MAIL REMOTE DATA TRANSFER SYSTEM

[76] Inventor: James G. Wilber, 3 Greenleaf Park, Unit A, Merrimac, Mass. 01860

[21] Appl. No.: 733,371

[22] Filed: Jul. 22, 1991

Related U.S. Application Data

[63] Continuation of Ser. No. 410,939, Sep. 22, 1989, abandoned.

[51] Int. Cl.$^5$ .......................................... H04M 11/00
[52] U.S. Cl. ........................................ 379/98; 379/95; 379/102; 379/104; 379/105; 379/373
[58] Field of Search ................. 379/95, 102, 104, 105, 379/106, 93, 96, 97, 98, 377, 375, 373

[56] References Cited

U.S. PATENT DOCUMENTS

| | | | |
|---|---|---|---|
| 3,475,557 | 10/1969 | Morse et al. | 179/2 |
| 3,976,840 | 8/1976 | Cleveland et al. | 379/95 |
| 4,524,244 | 6/1985 | Faggin et al. | 379/93 |
| 4,596,900 | 6/1986 | Jackson | 179/2 A |
| 4,621,334 | 11/1986 | Garcia | 379/95 |
| 4,647,721 | 3/1987 | Busam et al. | 379/102 |
| 4,679,226 | 7/1987 | Muehleisen | 379/95 |
| 4,685,124 | 8/1987 | Smitt et al. | 379/95 |
| 4,686,699 | 8/1987 | Wilkie | 379/93 |
| 4,701,946 | 10/1987 | Oliva et al. | 379/98 |
| 4,723,269 | 2/1988 | Summerlin | 379/102 |
| 4,748,654 | 5/1988 | Gray | 379/104 |
| 4,763,351 | 8/1988 | Lipscher et al. | 379/95 |
| 4,788,714 | 11/1988 | Hashimoto | 379/102 |
| 4,821,312 | 4/1989 | Horton et al. | 379/102 |
| 4,841,561 | 6/1989 | Hill | 379/97 |
| 4,905,281 | 2/1990 | Surjaatmadja | 379/95 |
| 4,935,958 | 6/1990 | Morganstein et al. | 379/201 |
| 4,959,853 | 9/1990 | Del Monte et al. | 379/373 |
| 4,998,273 | 3/1991 | Nichols | 379/373 |
| 5,008,926 | 4/1991 | Misholi | 379/94 |
| 5,063,593 | 11/1991 | Kwon | 379/377 |
| 5,070,523 | 12/1991 | Hafer et al. | 379/102 |

OTHER PUBLICATIONS

Article "Fax Mate", Radio-Electronics, 1989, pp. 33-36.
Product Brochure "PC Power Center", Power up a PC from anywhere, Anytime; EKD, Selden, N.Y.
Product Advertisement "Homeminder" Radio Shack-/Tandy Corp., Fort Worth, Tex.
Article "Making Connections"; Richard M. Foard, President of ROADNET Systems Corporation, Baltimore, 1985.
Article "Who's Working at Home-and Why?"; Nick Sullivan, Family & Home-Office Computing, Mar. 1988, pp. 48-49.
Article "Telecomputing"; Nick Sullivan, Family & Home-Office Computing, p. 18.
Article "Home-Office Shoptalk"; Family & Home-Office Computing, p. 58.
Article "Information Tools for Executives"; High Technology Business, Mar. 1988, p. 64.
Article "Component makers see dollars in new laptops"; Electronic Business; Jan. 15, 1988, p. 104.

Primary Examiner—Curtis Kuntz
Assistant Examiner—Stella L. Woo
Attorney, Agent, or Firm—Stephen G. Matzuk

[57] ABSTRACT

An apparatus connecting and establishing a communication link between a local and a remote computer to provide transfer of data wherein the remote computer is activated by a control unit, identification and protocol established and data transferred, as may be applied to provide personal electronic mail service. The preferred embodiment interposes the control unit between a non-dedicated telephone line and a remotely located personal computer having a modem therein, wherein a computer power-switching relay is connected to the control unit and is energized upon recognition of a selected protocol as provided by selected program control of the originating computer, and the communications link established via program responses of the remote computer and programmed signal initialization and responses of both computers according to firmware in the controller. Thus, according to the present invention mail transfers to or from an unattended remotely controlled computer is provided by activating an unattended remote computer or interruption of ongoing remote computer operations, such as word processing at the remote computer. Furthermore, according to the present invention, two levels of access security are provided by the control unit without further encumbering the sequence and process of data transfer.

33 Claims, 15 Drawing Sheets

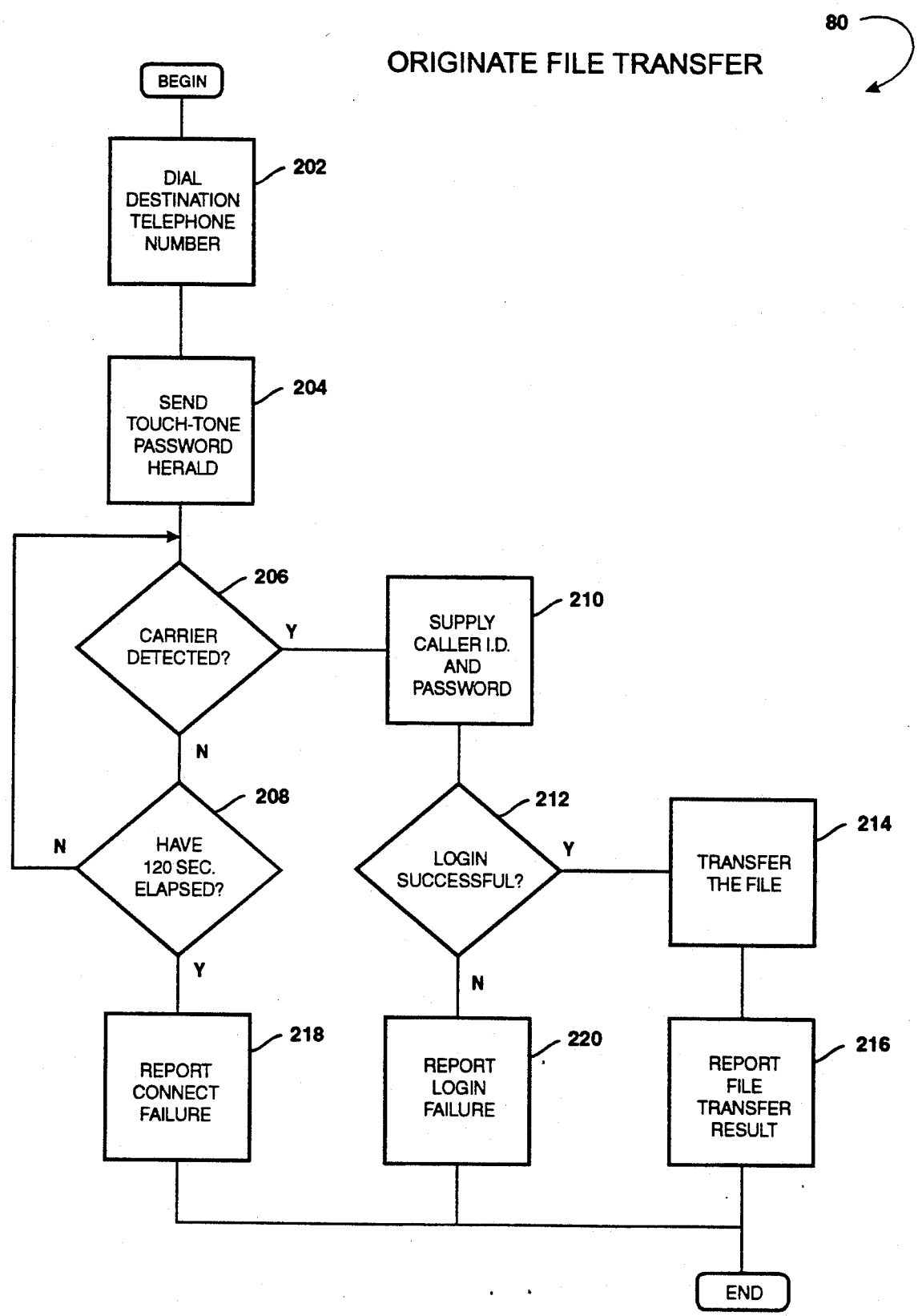

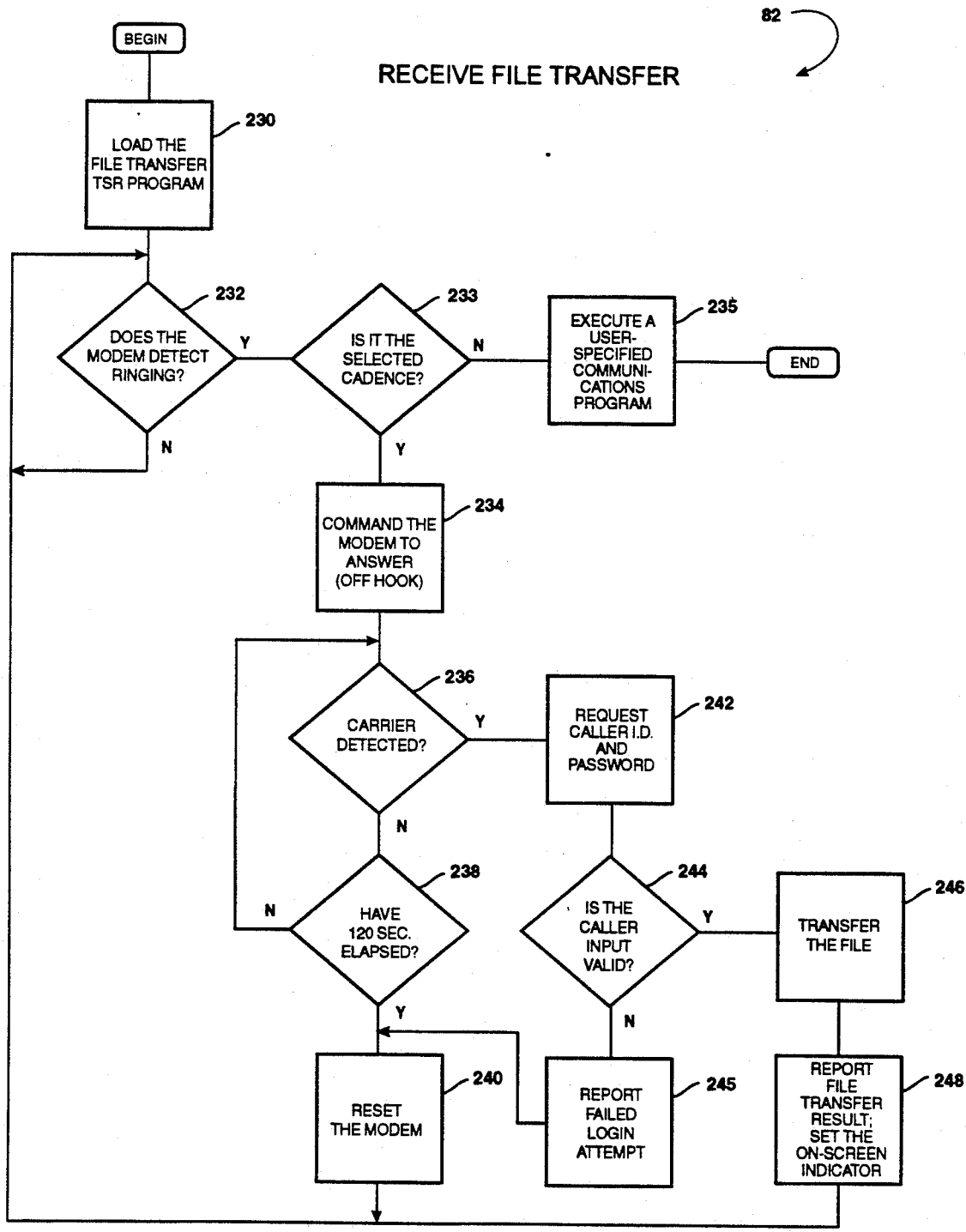

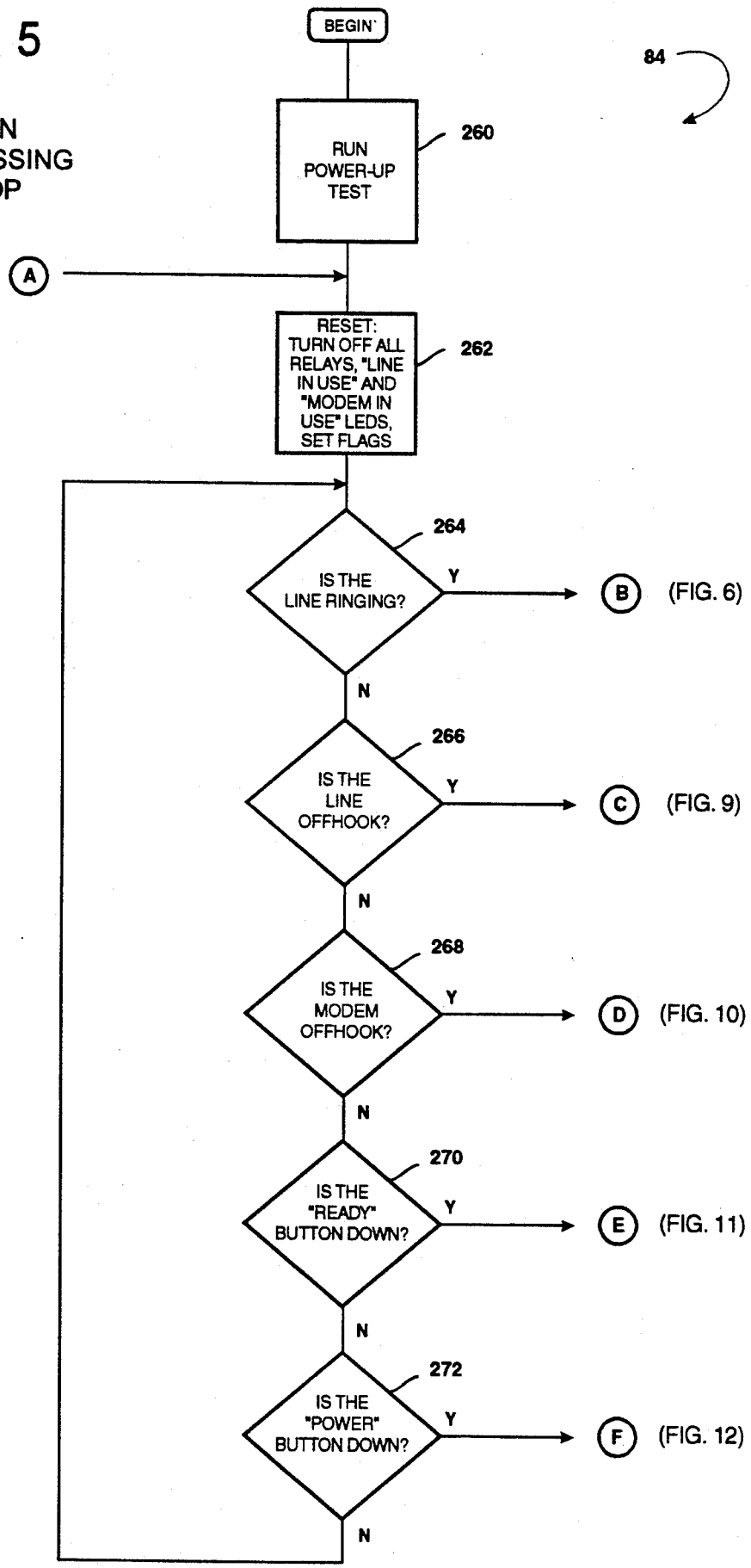

PROCESS "LINE RINGING"

FIG. 7 — PROCESS "AUTOMATIC TOUCH-TONE PASSWORD"

PROCESS "LINE OFFHOOK"

PROCESS "MODEM OFFHOOK"

FIG. 11    PROCESS "READY BUTTON DOWN"

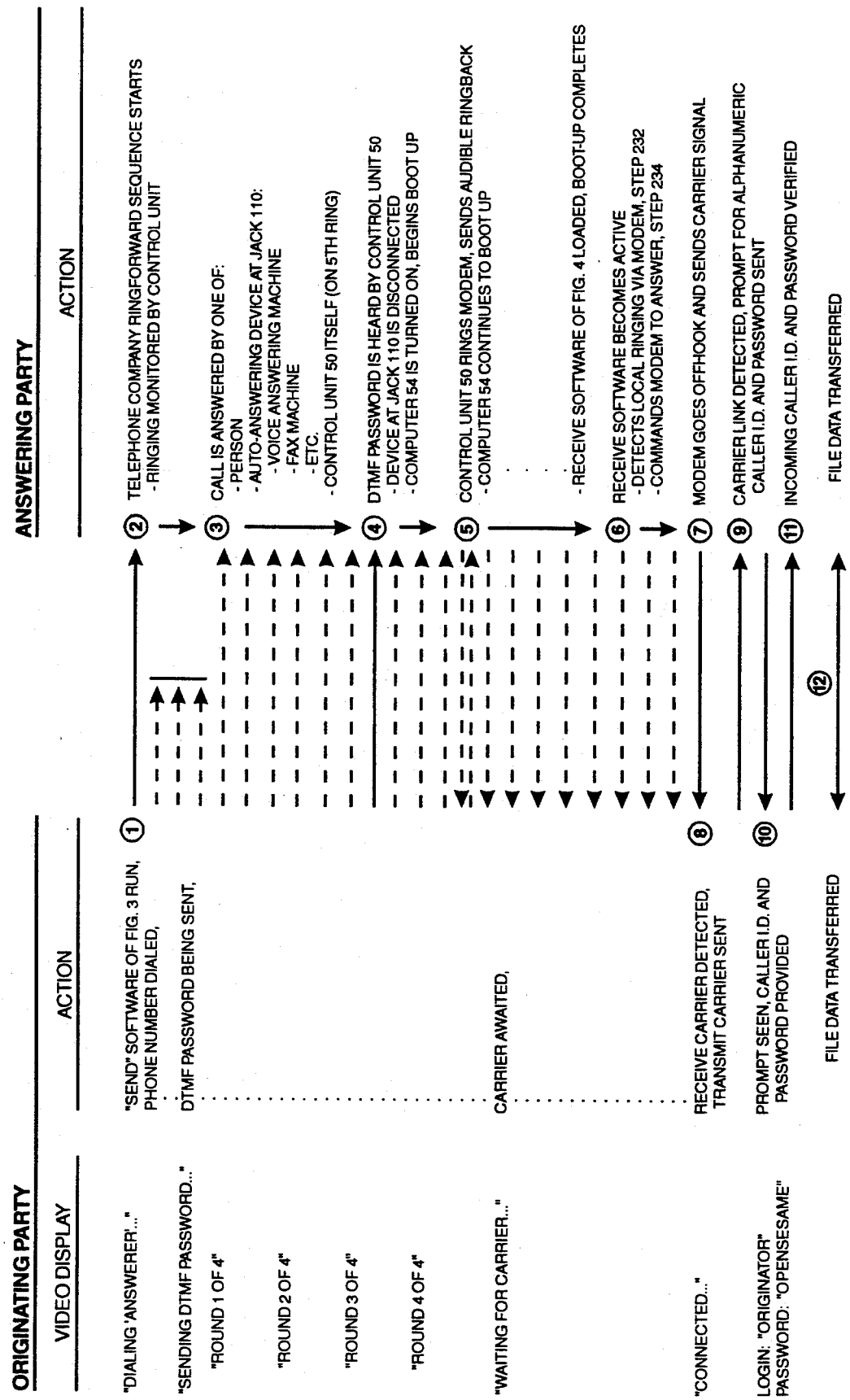

ELECTRONIC MAIL REMOTE DATA TRANSFER SYSTEM

This application is a continuation of application Ser. No. 410,939, filed 22, Sep. 1989, now abandoned.

FIELD OF THE INVENTION

The present invention relates to data transfer systems, in particular, data transfer systems providing file transfer between a local and an attended or unattended remote computer via telephone line or other communication medium.

BACKGROUND OF THE INVENTION

Data transfer to or from remote data equipment such as home personal computers has heretofore required the presence of an operator to power-up and initialize the remotely located computer in preparation for receiving or transmitting data. If unattended, such remotely located computers would necessarily be left on and preset to receive file transfer commands or other instructions to provide the desired data transfer. Such continuous operation, however, results in continuous power consumption, increased component wear, and makes the remote unit vulnerable to sophisticated intrusion efforts wherein data may be lost, damaged or unauthorized access gained. In an attempt to reduce power consumption and component wear, some systems include a power switch which is responsive to telephone line ringing signals wherein the personal computer is normally off except after an incoming telephone ring (referred to as a "ring-forward") signal is detected. Thereafter, the computer is turned on and configured to answer the ringing signal. However, such systems provide no pre-screening of non-data or unauthorized calls, resulting in needless sequencing of the computers whenever a telephone call is received. Furthermore, some modems answer immediately after receiving power and will therefore answer the ring-forward signal before essential communications software becomes active following boot up. Alternately, such remote systems require dedicated telephone lines, not normally provided or economically justifiable in the typical home or small office computer environment. Additionally, if a remote computer system is connected to a non-dedicated telephone line, no prioritized allocation of the line among a plurality of telephone line-associated equipment, such as a telephone desk set, an automatic answering machine, and the local personal computer is provided.

SUMMARY OF THE INVENTION

The system and apparatus according to the present invention automatically establishes a data transfer path between local data equipment and remotely located data equipment over a non-dedicated telephone line shared by other telephone apparatus such as a desk set and an automatic answering machine. According to the present invention, the remotely located data equipment is supervised by a control unit which provides the above-mentioned access security, energizing the computer only upon successful entry through the security check, thereby minimizing the power cycling of the remotely located data equipment due to other uses of the telephone line and unauthorized attempts at system entry. Moreover, the control unit included in the system according to the present invention will provide for the shared connection of an automatic call answering device, such as a voice answering machine to the telephone line, wherein upon detection of selected dual-tone multi-frequency (DTMF), or "touch-tone" (TM), password signals on the telephone line, the control unit will disconnect the automatic answering device, apply power to the data equipment if necessary, generate a ring signal voltage capable of causing the data equipment modem to respond as though connected directly to the telephone line, provide subsequent alphanumeric security code processing and, if successful, the ultimate data file transfer. Furthermore, according to the present invention, the local data terminal and the remote data terminal, both typically comprising personal computers, are programmed to automatically establish the file data transfer capacity, as may be applied to electronic mail applications, and include a level of alphanumeric password security inhibiting unauthorized access to the remotely located data files. A further feature of the present invention allows the status of the remotely located data system or the control unit itself to be determined at any available telephone having touch-tone signalling wherein a predetermined touch-tone code sequence results in an audible response from the control unit indicating the requested status such as data system power-on or power-off.

Moreover, if the remote computer system is currently engaged in an activity, as may be provided in any one of several operating systems, such as word processing, the system according to the present invention will minimally interrupt the ongoing operation of the remote computer to provide the data transfer, in the worst case, suspending the current operation to accomplish the data transfer and returning immediately thereafter to the point of operation prior to data transfer. Therefore according to the present invention, a system is provided wherein electronic mail service can be provided to a minimally configured remote location having non-dedicated telephone lines which decouples the incoming ring, boot up, and the local ring events so as to accommodate the timing needs of any PC installation.

DESCRIPTION OF THE DRAWING

These and other features according to the present invention will be better understood by reading the following Detailed Description of the Invention, taken together with the drawing wherein:

FIG. 3 is a flow chart showing a program sequence resident in the originating computer according to FIG. 1;

FIG. 4 is a flow chart showing the program resident in the remotely located computer according to FIG. 1;

FIG. 5 is the flow chart of the main processing loop of the control unit of FIG. 1;

FIG. 13 is a protocol diagram of one embodiment of the present invention as described in FIGS. 3-12.

DETAILED DESCRIPTION OF THE INVENTION

Figure 1:
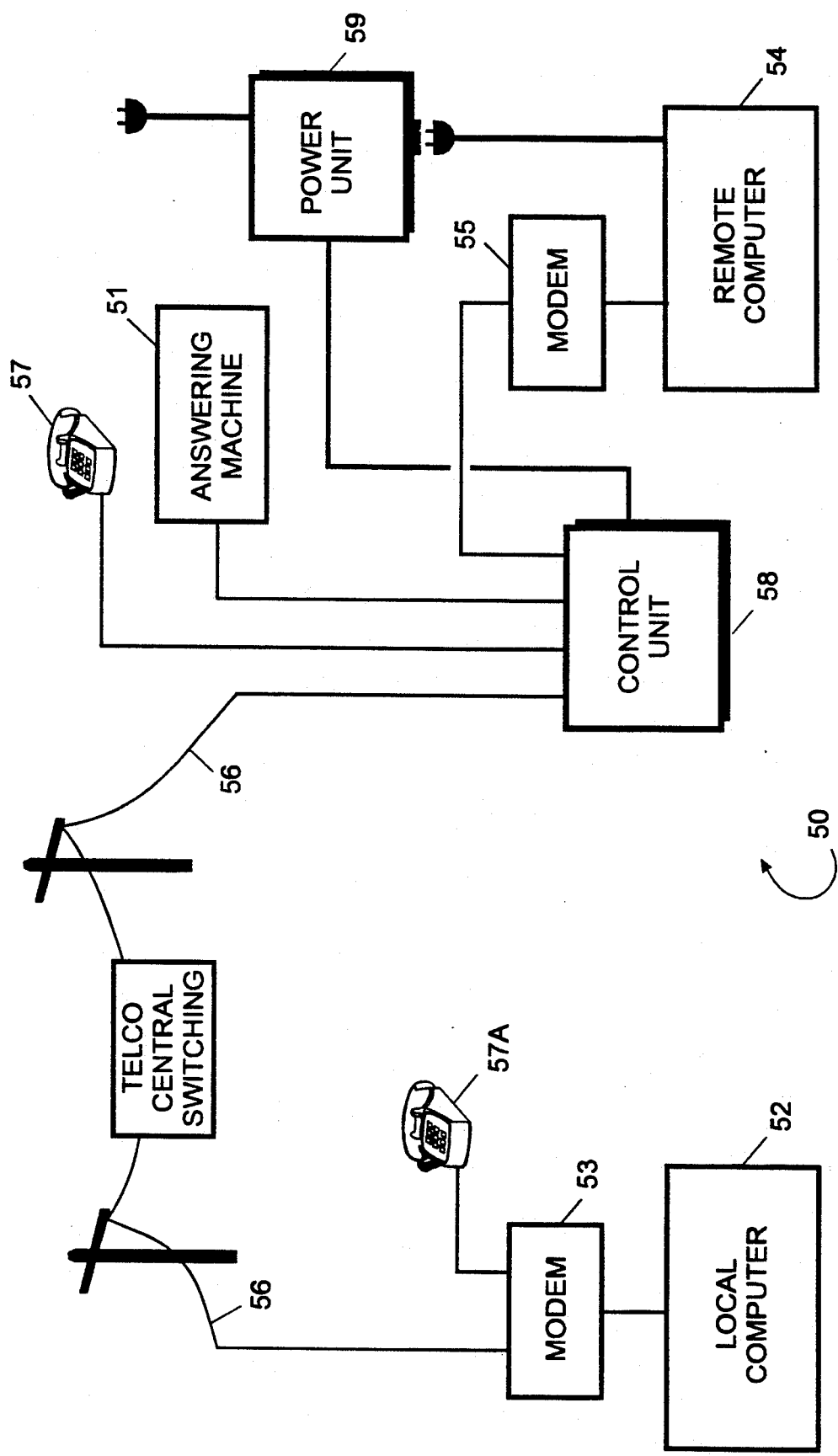
FIG. 1 is a block diagram of a system including the remotely located computer and the control unit according to one embodiment of the present invention.

The present invention is shown in FIG. 1, in a system 50 which provides the file transfer between a local computer 52 and a remote computer 54 through a communication medium such as a telephone line 56 through modems 53 and 55 in, or connected to, computers 52 and 54 respectively. According to the present invention, control of the remote computer 54 is provided by a control unit 58 which is connected to a non-dedicated telephone line 56. The non-dedicated telephone line can also be connected to other devices such as a desk set 57 and an answering machine 51. Power to the remote computer 54 is controlled by the power unit 59 connected to the control unit 58. The local computer 52 and the remote computer 54 include operating system software such as MS-DOS (TM) and may be further programmed with software such as LOTUS 1-2-3 (TM). The local computer 52 is operable according to a program comprising this invention as illustrated by the flow chart of FIG. 3, to originate the establishment of data or file transfer. The remote computer 54 is operable by program software comprising this invention as illustrated by the flow chart of FIG. 4 to provide a response to a request for data transfer. The remote computer control unit 58 comprises the hardware illustrated in FIGS. 2A and 2B and is operable according to the flow charts of FIGS. 5-12, as well as modifications made by those of ordinary skill in the art.

According to one embodiment of the present invention, both the local computer 52 and the remote computer 54 and their respective modems 53 and 55 are commonly available commercial products such as the IBM PC computers and the Hayes modems or their equivalent. The modems may be internal components of the computers or connected externally. The communication medium 56 typically comprises a normal telephone line 56, but other media may be used, for example isolated wiring employing the standard RJ-11 telephone jacks may be used in the home. The telephone switching office operates conventionally and forms no part of the invention. Similarly, the telephones 57 and 57A illustrated in FIG. 1 and the answering machine 51 comprise standard commercially-available units. Therefore, the present invention permits the above-mentioned and below-described improvements with minimal interference with standard system configurations, except for the redirected telephone line connections through the control unit 58 and the power connection through the power unit 59.

Figure 2A:
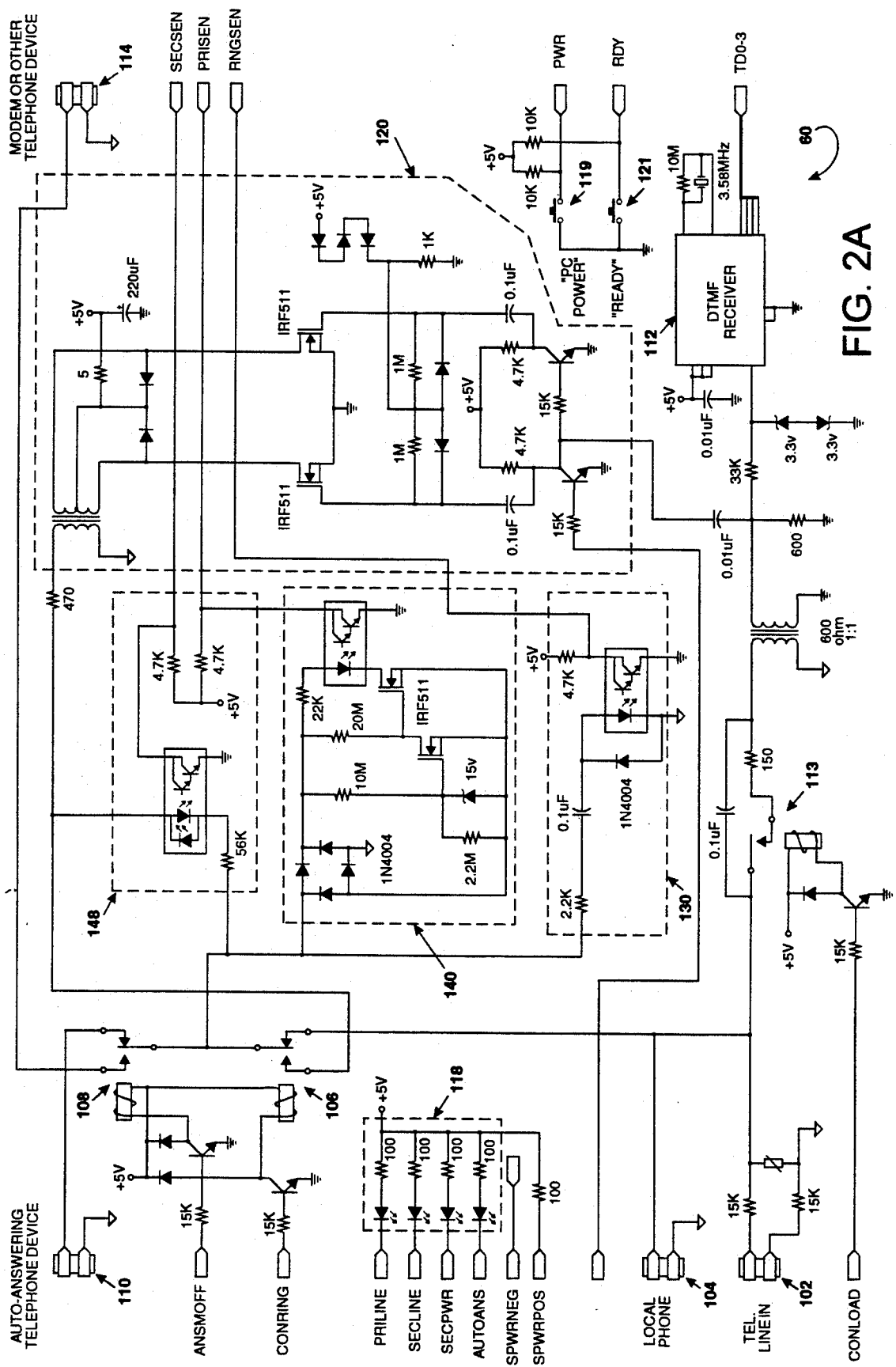
FIGS. 2A and 2B are schematic diagrams of the control unit of FIG. 1.
Figure 2B:
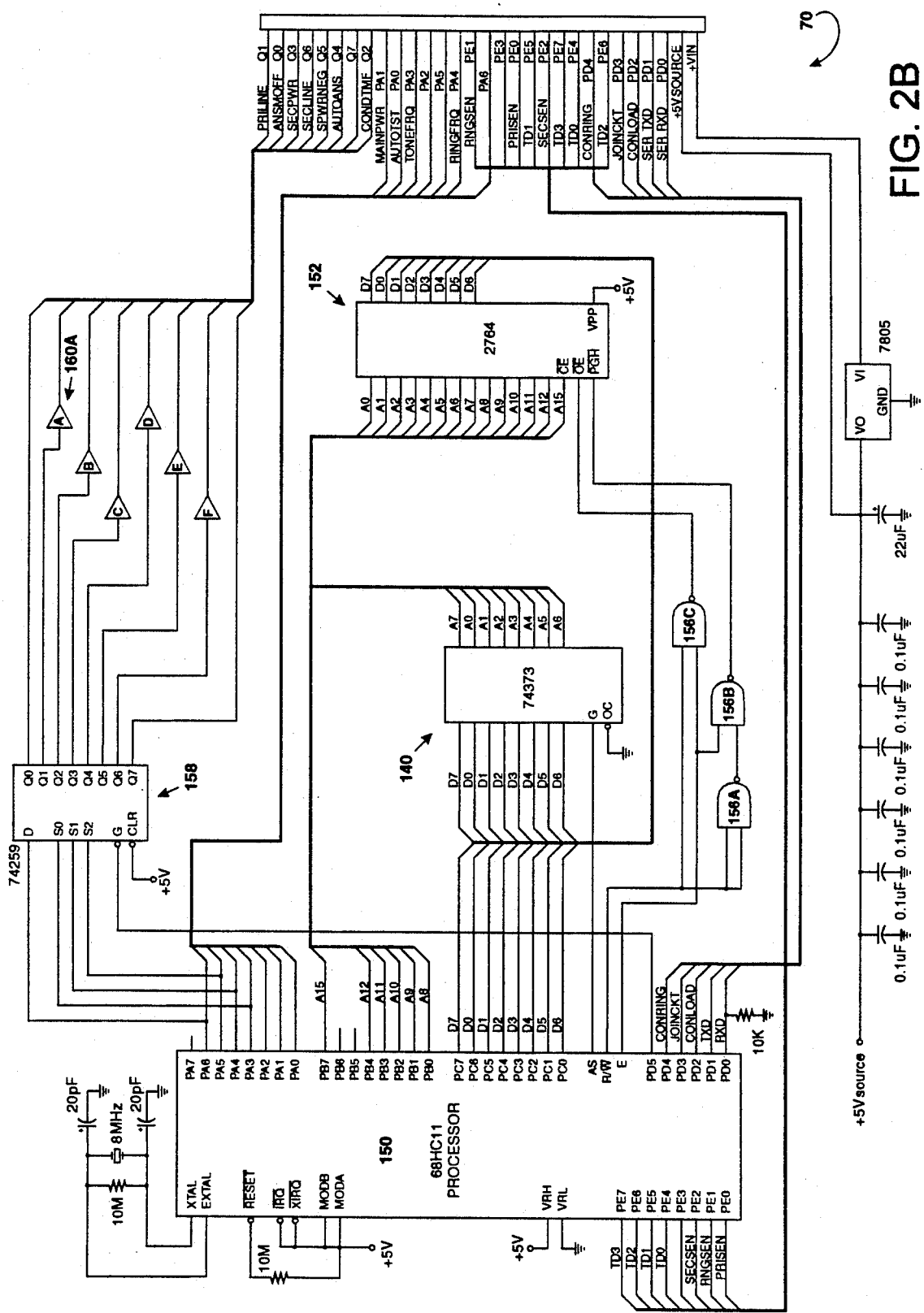

The control unit 58 of FIG. 1 is described in greater detail by the schematic diagrams illustrated in FIGS. 2A and 2B and the flow chart illustrations of the firmware stored in the memory 152 and executed by the microprocessor 150, according to the flow chart representations of FIGS. 5-12. In the schematic diagram 60 of FIG. 2A, a telephone line 56 of FIG. 1 is connected to line-in jack 102 which provides connection to telephone 57 through local phone jack 104 and connection to relays 106 and 108. In a quiescent or power-off condition, the relays 106 and 108 provide connection of an auto answering device, such as a telephone answering machine and a facsimile machine, via jack 110 to the line input 102 for normal automatic answering. Relays 106 and 108, controlled by their respective transistors and microprocessor 150 of FIG. 2B route the telephone signal as described previously, and in greater detail below. For instance, when touch-tone or data signals are detected, such as by the DTMF receiver 112 of various manufacturers, which is connected to receive signals from the line input from jack 102, by the microprocessor 150 connected to receive the four digital signals from the DTMF receiver 112, they cause the relay 108 to become energized, disconnecting the answering device connected at jack 110 and connecting the modem of the remote computer 54 or other telephone device connected via jack 114. Simultaneously, the microprocessor 150 of FIG. 2B enables the power unit 59 of FIG. 1 to power the remote computer 54 via pins 28-31 of the microprocessor 150. Having turned on the remote computer 54, the associated modem 55 is now operable to receive signals, whereupon the microprocessor 150 generates a 20 Hz high-voltage ring signal via circuit 120 which is applied to the modem by relay 106 as controlled by the microprocessor 150 through the transistor associated with relay 106 and provide a ring-back signal to said signal line input.

A ring-forward sense is provided by circuit 130, whereupon a signal is received by the microprocessor 150 upon detection of a ring signal on the line input of jack 102. A primary off-hook sense signal is provided by circuit 140 and a secondary off-hook signal is provided by circuit 150 to indicate to the microprocessor 140 the presence of the off-hook condition of the incoming line input and the relative off-hook condition of the modem 55 connected to jack 114.

Figure 2C:
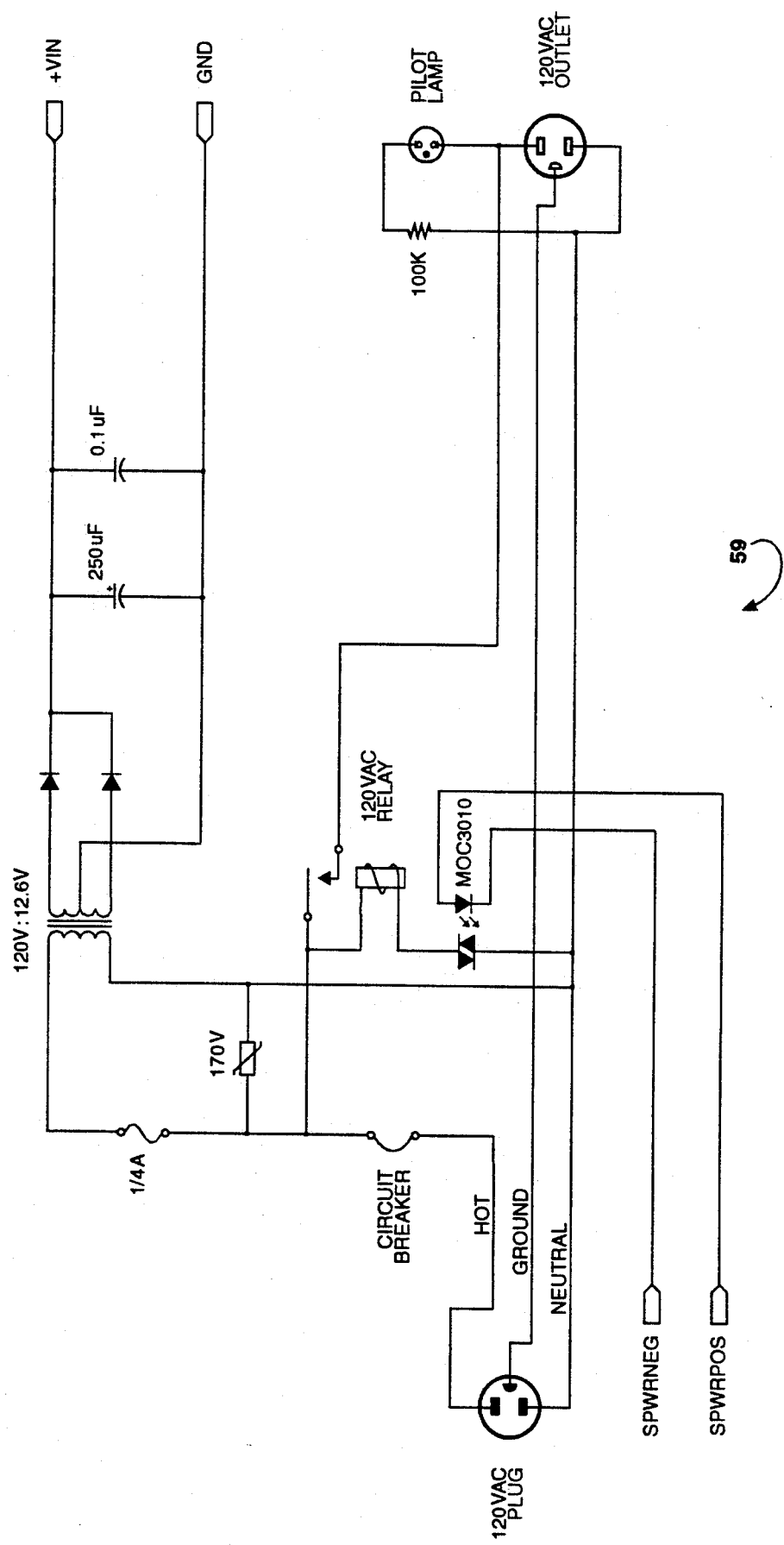
FIG. 2C is a schematic diagram of the power unit of FIG. 1.

The power control provided by power unit 59 in response to the control signal from the control unit 58 is provided by an optically-coupled triac and relay combination shown in FIG. 2C or other power element which provides AC switching functions in response to a low level signal as may be provided by the microprocessor 150 of FIG. 2B.

The microprocessor control section of the control unit 58 is shown in more detail in the schematic diagram 70 of FIG. 2B, wherein the microprocessor 150 is operable according to firmware control stored in memory 152, and is operable according to the flow charts of FIGS. 5-12. The memory 152 receives address signals via register 154, and is controlled by signals from the microprocessor 150 through gates 156A, 156B and 156C. While the microprocessor 150 comprises a 68HC11 manufactured by Motorola Corporation and others. Additional control signals are provided by the microprocessor 150 via 8-bit addressable latch 158 and gates 160A, B, C, D, E, and F. Signals directed from the microprocessor section to the line interface section 60 of FIG. 2A are provided through correspondingly labelled tags on the periphery of 2A and 2C and include signals to light-emitting diode (LED) indicators 118 of FIG. 2A providing the indication of selected states of the control unit, computer modem and other line conditions as described.

According to the present invention, the local computer 52 of FIG. 1 includes a program which operates in the context of an operating system, such as the one belonging to the Apple Macintosh, or DOS in the case of IBM PC-type computers. The program, although not necessary for some aspects of the present invention, provides for the automatic origination of data file transfers as illustrated in the flow chart 80 of FIG. 3. The destination telephone number is dialed at step 202 and a DTMF password is repetitively sent at step 204. After transmission of the DTMF password at step 204, the local computer waits for a signal tone relayed by the control unit 58 at step 206, until a specified time, such as 120 seconds, has elapsed, as provided by step 208. If a carrier is detected, as provided by the remote computer control unit 58, the local computer then supplies the caller identification (ID) and password at step 210 when prompted by the remote computer 54 at step 242 of FIG. 4. A typical correct response results in a successful log-in process at step 212, which is then followed by the transfer 214 of the data between the remote computer 54 and the local computer 52. The results of the file transfer are reported at 216, typically by an on-screen or other visual or audible indication as may be provided. Specifically, the receipt of a file results in a flashing indicator light and the appearance of an on-screen indicator. Similarly, if more than the specified time has elapsed, a failure to connect is reported at step 218 and a log-in failure, such as the refusal of the log-in caller ID and/or password is reported at step 220.

The remote computer 54 includes a program which responds to the telephone-ringing flags set by the modem 55 when the remote computer 54 is powered-on by the power unit 59 in response to the control unit 58, which was in turn previously activated by the signal sequence discussed above as iterated by the local computer 52. The program sequence is described generally in flow chart 82 of FIG. 4, wherein the remote computer 54 optionally loads and executes the service program of 82 at step 230, and begins polling the modem to determine if a telephone ringing signal is being received at step 232. If a ringing signal is detected by the modem, the cadence of the signal, meaning the characteristic durations of AC ring voltage present and absent in a cycle, is examined at step 233. If the cadence is recognized as that generated by the control unit 58 to indicate that an automatic data transfer is desired, the modem is commanded to answer (go off-hook) at step 234 and wait for a carrier detect within a specified time period, e.g. 120 seconds, steps 236 and 238. If instead a determination is made at step 233 that the cadence indicates a different communications program is desired, this program, identified earlier during installation of software on the remote computer 54, is executed at 235. Step 233 thus permits more complete access to the files on the remote computer 54, afforded by the more elaborate program 235, at the cost of consuming more of the computers resources and effectively preempting simultaneous operations under the DOS operating system. If no carrier is detected at step 238 the modem is reset at step 240 and the remote computer 54 again awaits the ringing signal at step 232. If a carrier is detected at 236, a signal is sent to the local computer 52 which requests or prompts the local computer 52 to provide a caller ID and a password at step 242. The caller ID and password are verified at step 244, and if found appropriate a file transfer is executed at step 246. If at least one of the received caller ID and password fails to belong to the set of valid caller ID and password combinations stored at the remote computer 54, the modem is reset at step 240. The transfer of a file or other data at step 246 is completed after which the transfer is reported by appending an entry to an event log file and issuing an on-screen or audible operator signal at step 248.

Figure 6:
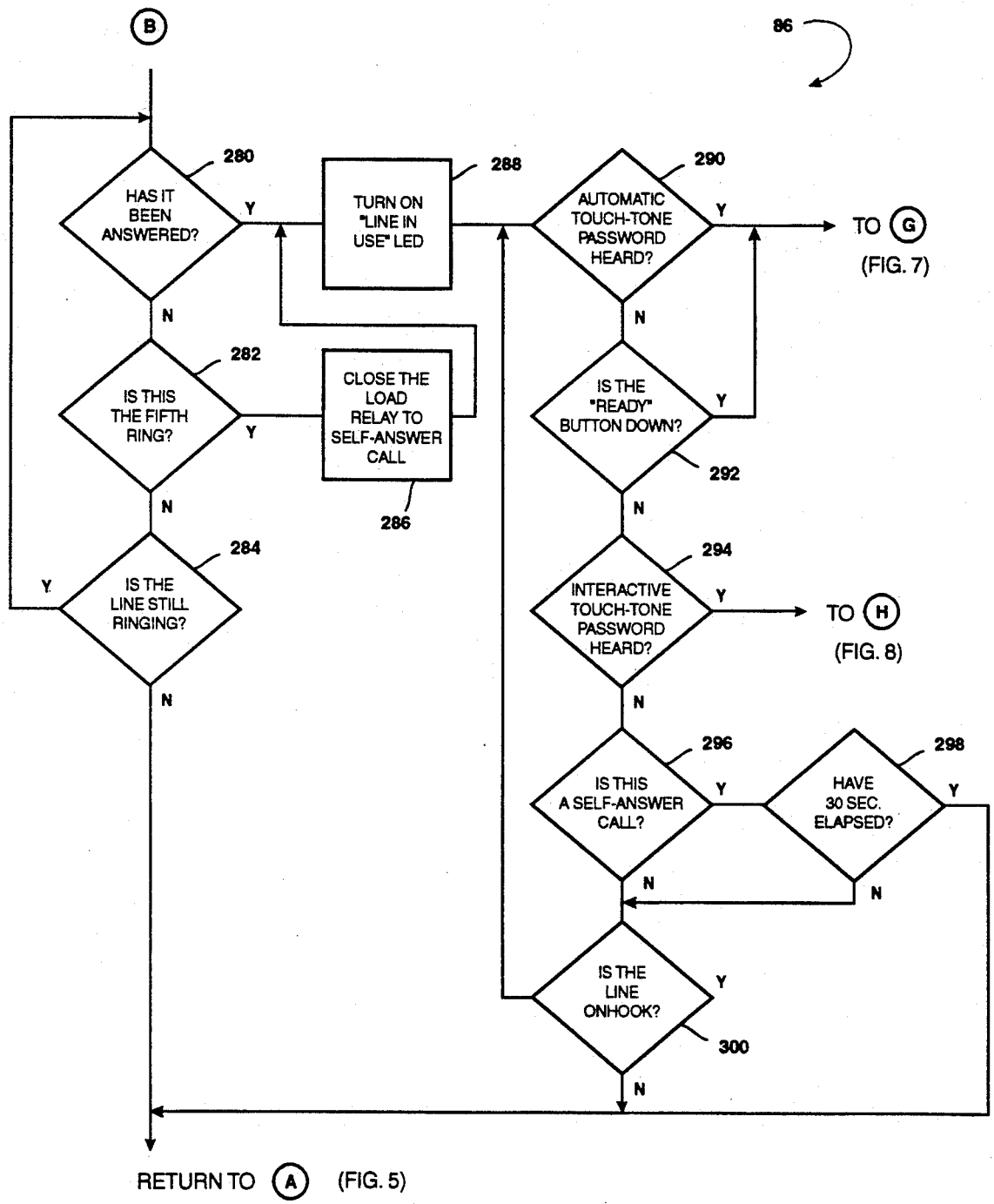
FIG. 6 is the line-ringing service subroutine of the control unit of FIG. 1.
Figure 9:
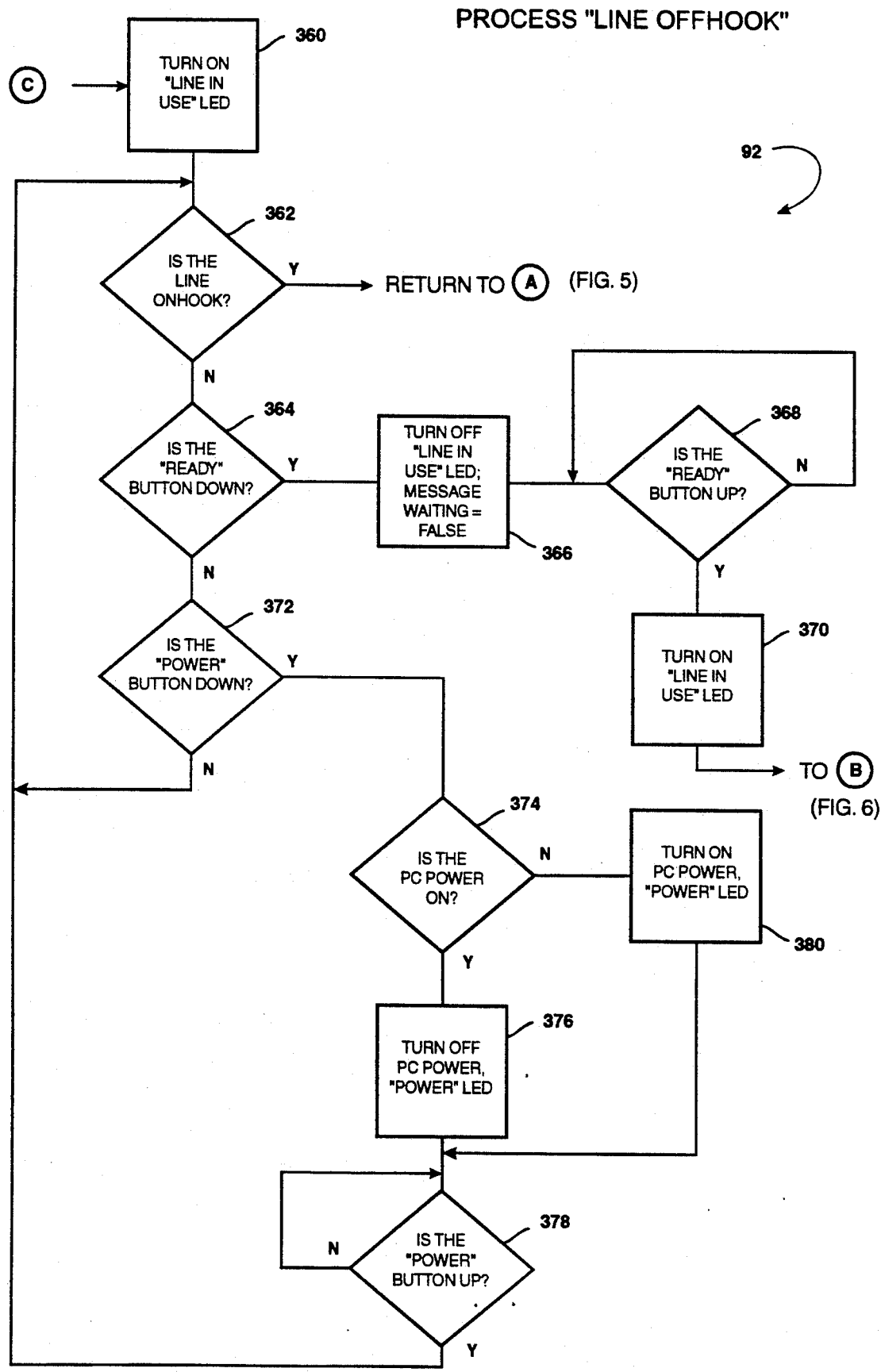
FIG. 9 is the line off-hook subroutine of the control unit of FIG. 1.
Figure 10:
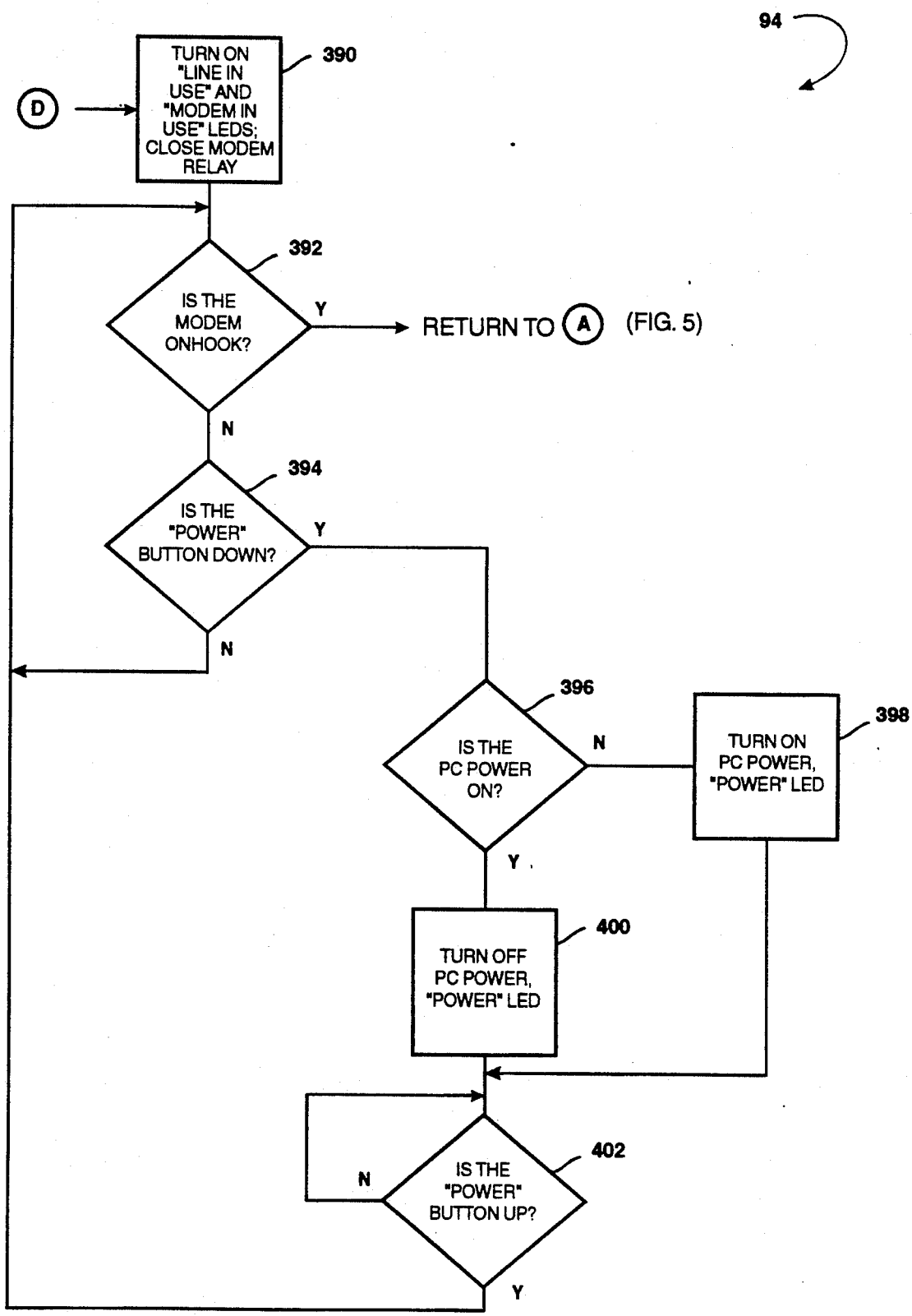
FIG. 10 is the modem off-hook subroutine of the control unit of FIG. 1.
Figure 11:
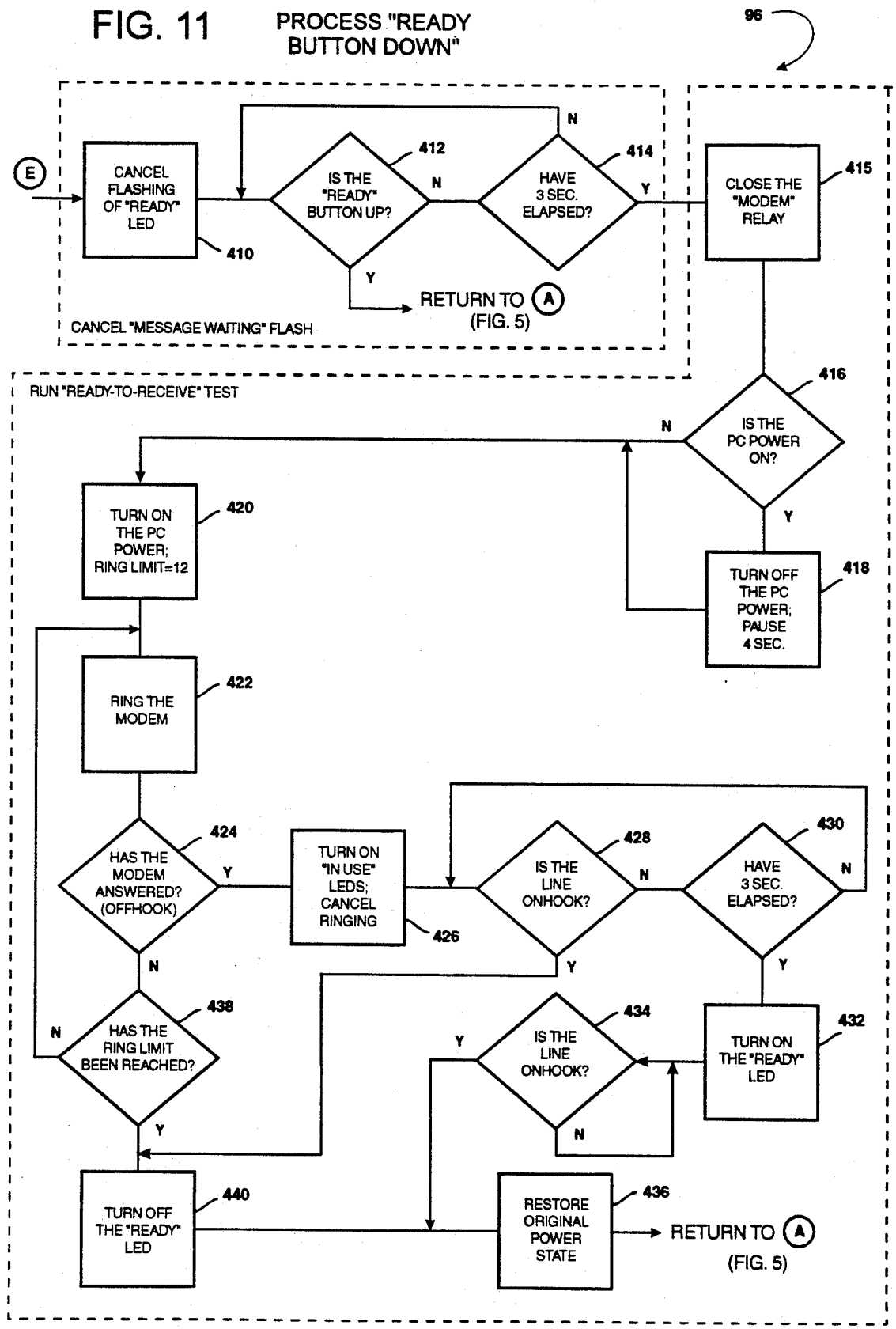
FIG. 11 is the ready-button-down subroutine of the control unit of FIG. 1.
Figure 12:
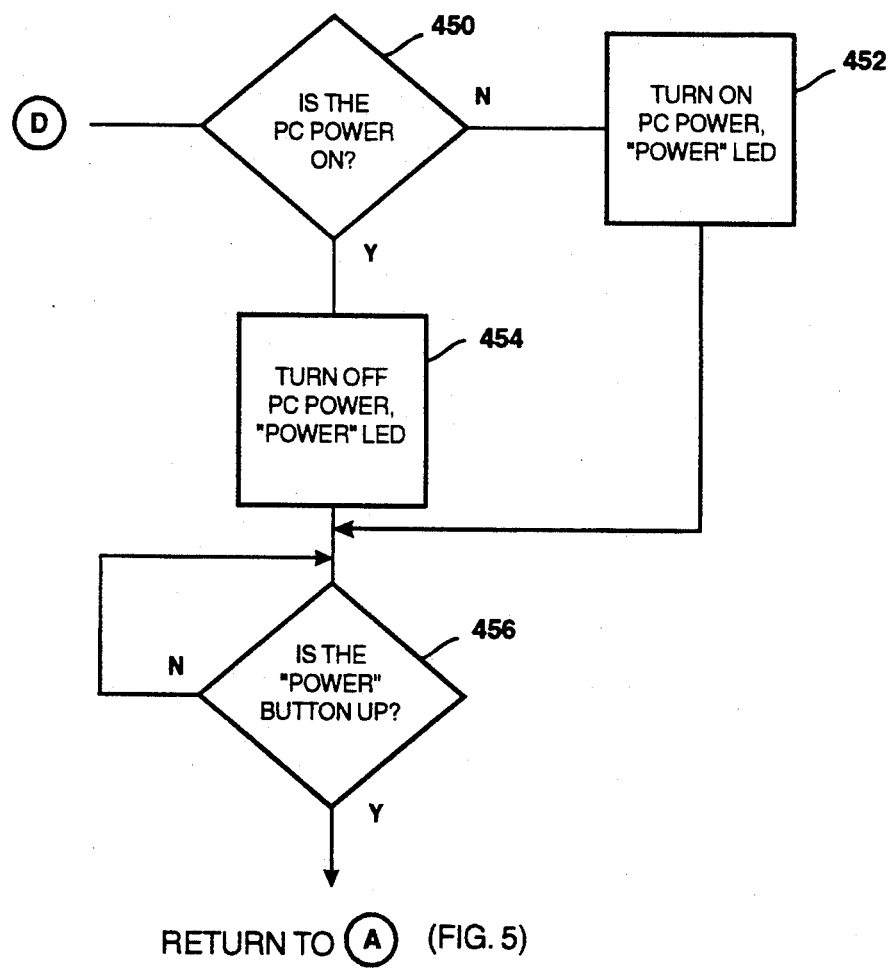
FIG. 12 is the power-button-down subroutine of the control unit of FIG. 1.

The control unit 58 associated with the remote computer 54 includes a microprocessor-controlled system having firmware to provide the appropriate detection, signalling, and control functions. The main processing loop flow chart 84 is shown in FIG. 5. Upon initial power-up, such as when first plugged into the power mains of the remote site, the control unit provides an automatic power-up self-test at step 260. All internal and external signals are reset at step 262 and the main program enters a loop. The main loop includes a test 264 to determine if a telephone line ringing condition exists. If a ringing signal is present on the telephone line 56 connected at jack 102, the line ringing subroutine 86 of FIG. 6 is begun. An off-hook condition of the line is determined at step 266, and the line off-hook subroutine 92 of FIG. 9 is entered. If the modem 55 of the remote computer 54 is off-hook, as determined by step 268 via sub-circuit 148 of FIG. 2A, the modem off-hook subroutine 94 at FIG. 10 is begun. If the "ready" button 121 (FIG. 2A) is depressed (contact closed), as determined by step 270, the ready-button-down subroutine 96 of FIG. 11 is begun. If the "PC power" button 119 (FIG. 2A) used to manually turn on the remote computer is depressed, the power-button-down subroutine 98 of FIG. 12 is begun. Until one of the above conditions is detected, the main processing loop 84 repeats. Upon completion of any of the aforementioned five tests and related subroutines, the programs re-enter the main processing loop prior to step 262, wherein the control unit signals are reset.

Figure 7:
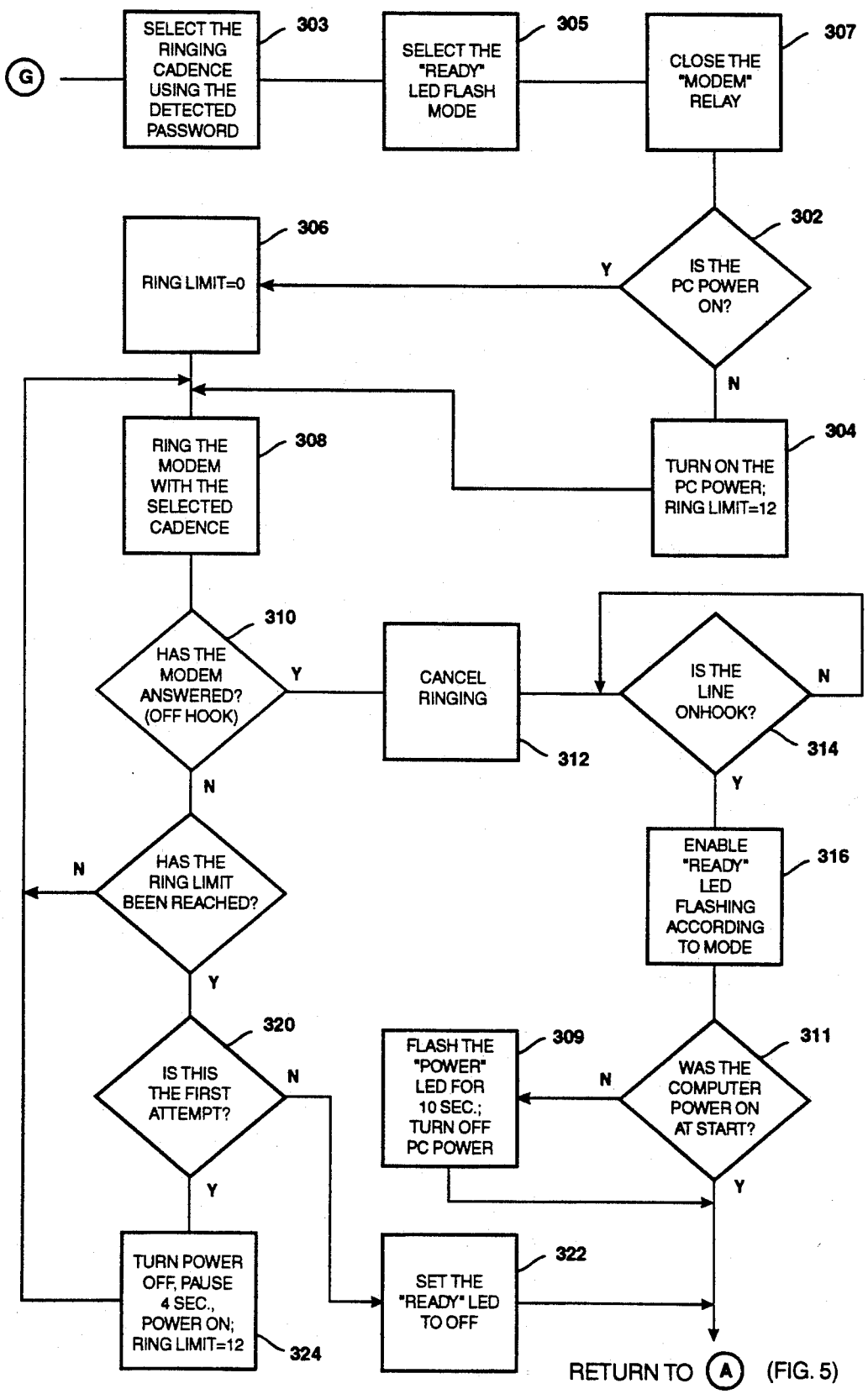
FIG. 7 is the automatic-mode DTMF password subroutine of the control unit of FIG. 1.

Upon detection of a line-ringing signal at step 64, of FIG. 5 the line-ringing subroutine illustrated by flow chart 86 of FIG. 6 determines if the ringing signal has been answered at step 280, and is allowed to ring until the fifth ring, steps 282 and 284 whereupon it is answered by connecting load 113 to the line input 102 of FIG. 2A, step 286. Once the call is answered, the line in-use LED indicator is turned on at step 288 and the system determines, via DTMF receiver 112, if an automatic-mode DTMF password is detected at step 290. The status of the "ready" button is determined at step 292. If either the "ready" button is depressed or the automatic-mode DTMF password is heard, the automatic-mode password subroutine 88 of FIG. 7 is begun. If neither condition exists, the system tests for an interactive-mode DTMF password signifying operator manual interaction with the controller 58 at step 294, which if present causes the interactive-mode password subroutine 90 of FIG. 8 to be executed. If no interactive-mode DTMF password is received, the system checks, at step 296, if the call is a self-answer call and whether 30 seconds have elapsed, at step 298. If both conditions are true, or if the line goes on-hook at step 300 or the call is abandoned before being answered, step 284, the control unit re-enters the main processing loop before step 262.

The automatic-mode DTMF password subroutine 88 of FIG. 7 identifies one of at least two local ring signal cadences, step 303, and one of at least two "ready" LED flash modes, step 305, associated with the automatic-mode DTMF password recognized at step 290, that will govern control unit actions for the modem or other telephone device 114 as well as disconnect any present automatic answering device 110. A determination is made whether the power of the remote computer 54, via power unit 59 is on at step 302. If not, the computer power is turned on and a ringing limit (e.g. 12 times), discussed below, is set in step 304. If the power to the computer 54 is currently on, a smaller ring limit (e.g. 8 times) is set in step 306. Next, at step 308 a ringing signal to the modem 55 is generated (120, FIG. 2A). The processor 150 fixes the frequency of the local ringing signal through firmware timing loops, and synchronously gates current pulses to the "modem in use" indicator so that the indicator flashes with the same frequency (e.g. 20 Hz in the preferred embodiment). If the modem has answered, step 310 (under control of the receive file transfer program 82, step 234), the ringing signal is cancelled at step 312, and a line on-hook test is made, step 314 to determine if the modem is on-hook. If the line is on-hook (140, FIG. 2A), signaling the completion of the file transfer and the disconnect of the call, the "ready" LED indicator is caused to flash, step 316 according to the flash mode identified in step 305. The flash mode associated with a selected password may correspond to a flash rate or even cause the indicator to stay on continuously, i.e., not flash. In this way certain data transfer operations which do not require attention at the remote computer such as files transferred from, rather than to, the remote computer, will not trigger the flashing indicator. At step 311, a determination is made whether the remote computer 54 power was on at the time the automatic-mode DTMF password was recognized. If the power was not on, meaning that it was turned on at step 304 for the purpose of servicing the current call, step 309 provides for the removal of power from the remote computer 54 after a selected time interval, nominally 10 seconds. According to the present invention, the processor 150 is programmed to provide flashing the "PC power" LED with a duty cycle proportional to the imminence of this automatic power removal. Over the defined time interval, the "PC power" LED indicates that a pending power-off situation exists by drifting from a "mostly on" appearance to a "mostly off" appearance before turning completely off coincident with the removal of power from the remote computer 54. This time interval may last ten seconds, ten minutes, as desired. The system then returns to the main processing loop before step 262. If the modem has not answered, step 310 and the ring limit (nominally 8 or 12) has been reached at step 318, and the current ring sequence was not the first attempt, step 320, the "ready" LED indicator is turned off, step 322 and the system resumes the main processing loop before step 262. On the first attempted ring sequence in which the ring limit is reached, as determined at step 320, the computer 54 power is turned off for four seconds and then again turned on, and the ring limit is set to 12 at step 324; the sequence is begun again at step 308 wherein the modem ring signal is provided.

Moreover, general mail may be received at step 246 according to the present invention when universal (not selected) DTMF and alphanumeric passwords are detected at steps 290 and 244, respectively. The universal DTMF password, identical for all installations of the present invention, is one of at least two automatic-mode DTMF passwords that the control unit 58 is capable of recognizing at step 290. Likewise, the universal alphanumeric caller ID and password are identical for all installations and are verified at step 244. The universal DTMF and alphanumeric passwords may be selectively enabled so as to accept mail from unknown callers at the remote computer 54 while maintaining selective file security to prevent unauthorized access to computer 54 files. When the universal passwords are selectively disabled, no access is granted to unknown callers.

Upon manual answering of a modem-originated call by telephone 57 not accompanied by the DTMF password repetition, pressing the "ready" button causes a local ringing voltage to be applied the modem 55 and completes the data transfer path transparently to the caller.

Figure 8:
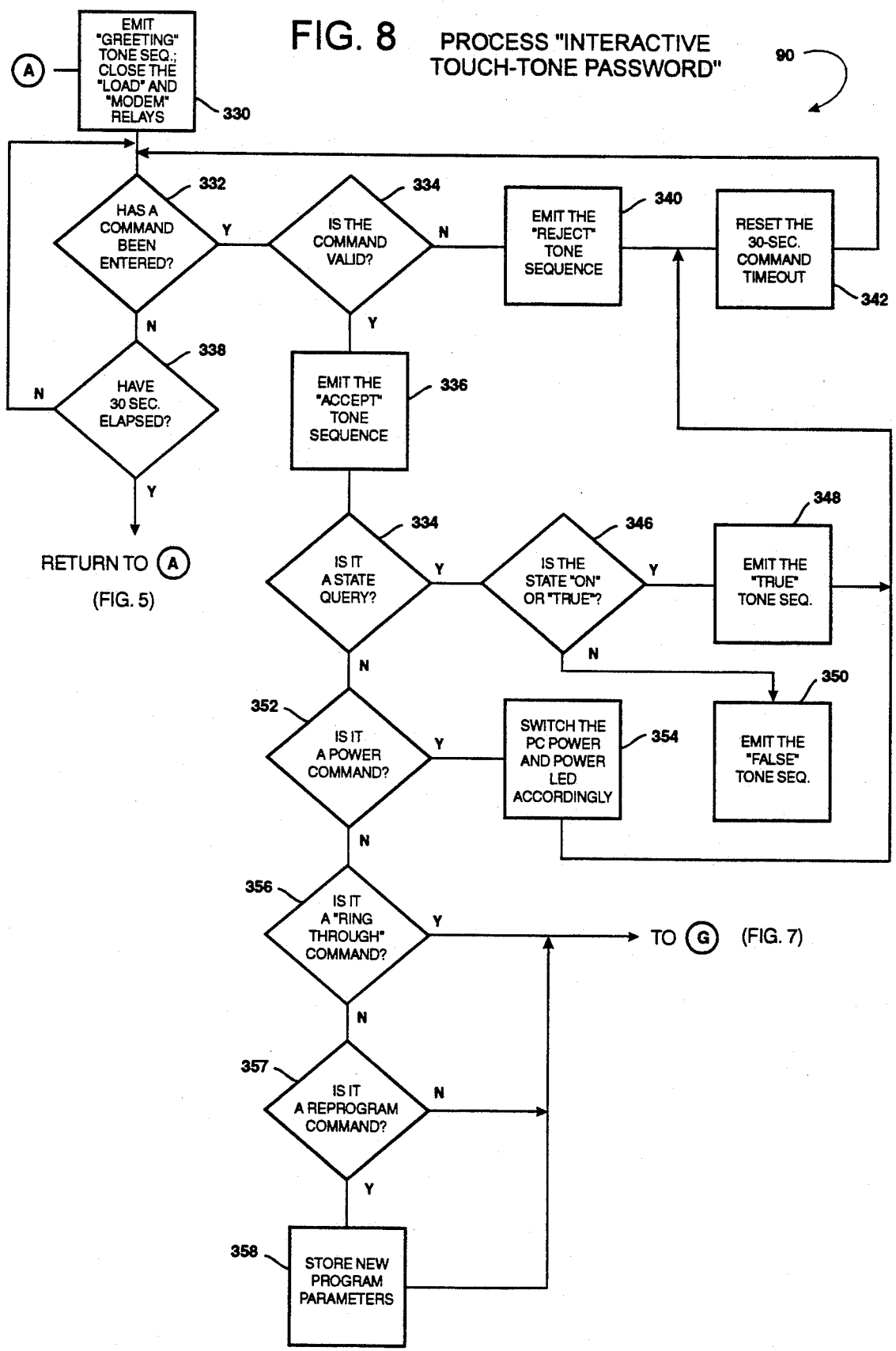
FIG. 8 is the interactive-mode DTMF password subroutine of the control unit of FIG. 1.

The interactive-mode DTMF password subroutine 90 of FIG. 8 responds to the detection of the interactive-mode DTMF password, step 294 of FIG. 6, whereupon a "greeting" tone sequence is sent to the initiating party and a load 113 placed on the line input to maintain an off-hook condition and relay 108 is energized so as to disconnect any device connected at jack 110, step 330. If a command has been entered at step 332 and it is determined to be valid at step 334, an "accept" tone sequence such as two notes of ascending pitch is placed on the telephone line at step 336. If a command has not been entered and more than 30 seconds have elapsed, step 334, the main processing loop is re-entered before step 262. If a command has been entered, at step 334 but is invalid, a "reject" tone sequence such as two notes of descending pitch is provided, step 340, and the 30-second command time-out interval timer is reset at step 342, prior to re-entering the command test at step 332. Once the "accept" tone sequence has been provided at step 336, the particular query of the initiating party is determined at step 344. If the query relates to the PC on/off status which is determined at step 346, a "true" tone sequence is returned to the initiating party via the telephone line at step 348 if the power is on, and a "false" tone sequence is returned to the initiating party if the power is off, step 350. Typically, the true tone sequence comprises a reference tone followed by a higher-pitched tone, while the false tone sequence comprises the same reference tone followed by a lower-pitched tone. Upon generation of the tone sequence, the command time-out is reset at step 342. If the received command is not a state query, a test is made at step 352 whether the initiating party intends to control the power of the remote computer 54. If so, the power unit 59 is energized or de-energized according to the received command and the power LED indicator is likewise turned on or off, step 354 and the 30-second command time out, 342, is reset. If the signal received is neither a power command or a query, the system according to the present invention provides a "ring-through" command which is detected at step 356 which causes the automatic-mode DTMF password subroutine 88 of FIG. 7 to begin. If the command is neither a ring-through command nor one of the previously discussed commands, the present system provides for additional commands.

For example, the present invention includes a provision to facilitate reprogramming of the control unit to be accomplished by entering a programming mode 358 through a selected programming password detected at step 357. This mode allows alteration of nominal program values such as "12 rings to the modem before giving up on the ready-to-receive test" as well as user definition of passwords and the particular sequence of actions taken when said selected passwords are recognized, such as waiting for on- or off-hook events to occur, pausing for selected time periods, and the issuing of control and phone-line-coupled audio signals.

The line off-hook subroutine 92 of FIG. 9 services a line off-hook condition detected at step 266 of FIG. 5.

The line in-use LED indicator is activated, step 360 and the system tests whether the input line is on-hook at step 362. If the input line is on-hook, the system re-enters the main processing loop before step 262. If the line is not on-hook, the status of the "ready" and "PC power" buttons is subsequently tested. If the "ready" button is down at step 364, the line in-use LED indicator is turned off and the "message waiting" flag is set to a false state, step 366, whereupon a test of the "ready" button is made at step 368. When tile "ready" button is released, the line in-use LED indicator is reactivated at step 370 and the line-ringing subroutine 86 of FIG. 6 is begun. In this way, the test of the "ready" button at step 364 provides the operator with a means of forcing the processor 150 into that state reached when incoming line ringing is detected and the call is answered. If the "ready" button is not depressed at step 364, and the "PC power" button is not depressed at step 372, the system returns to the on-hook line test of step 362. If the "PC power" button is depressed at step 372 and the computer 54 power is on at step 374, the computer is turned off at step 376 and the state of the "PC power" button is tested at step 378, whereupon the line on-hook test is made at step 362 and, if the "PC power" button is up at step 378. If the computer 54 power is off, the power is turned on and the power LED indicator is energized at step 380.

If the modem is off-hook, step 268 of FIG. 5, the modem off-hook subroutine 94 is begun, FIG. 10 wherein the modem relay 108 is energized and the line in-use and modem in-use LED indicators are turned on, step 390. The modem is tested to determine if it is on-hook at step 392, whereupon the program re-enters the main processing loop before step 262 if the modem is on-hook. If the modem is not on-hook, step 392, and the "PC power" button is down, step 394, the power status of the remote computer 54 is tested at step 396, whereupon the computer power is turned on as well as the power LED indicator at step 398. If the remote computer 54 power is on, it is turned off and the power LED indicator is turned off at step 400. Subsequently the status of the "PC power" button is detected at step 402, whereupon the modem on-hook test at step 392, is again provided, if the "PC power" button is depressed at step 394, and if the "PC power" button is not depressed at step 402.

If the "ready" button is down, as determined by step 270 of FIG. 5, the ready-button-down subroutine 96 of FIG. 11 is begun wherein the flashing of the "ready" LED is cancelled at step 410, and the status of the "ready" button is provided at step 412, whereupon the program re-enters the main processing loop before step 262 if the "ready" button is up. If the "ready" button is not up and three seconds have not elapsed, the "ready" button-up test at step 412 continues; if more than three seconds have elapsed at step 414, a ready-to-receive test is begun which comprises steps numbered 416 through 436. This sequence of operations verifies the operability of the remote computer 54, circuits of the control unit 58, modem 55, all necessary electrical connections, and program steps 230, 232, and 233 diagrammed in FIG. 4 to work in concert to successfully execute step 234 of FIG. 4. Toward this end, if the remote computer 54 power is on at step 416, the remote computer power is turned off and a four-second pause is executed, at step 418. If the remote computer 54 power is not on, it is turned on and the ring limit nominally set to 12 rings, at step 420. The modem is signalled by a ring voltage 120 at step 422. It is then determined whether the modem has answered the ring signal, step 424, whereupon the in-use LED indicators are activated and the ringing signal is cancelled at step 426 if the modem has answered the ring signal. Thereafter, it is determined if the line is on-hook, step 428, whereupon the test is continued for three seconds at step 430. If more than three seconds has elapsed and the line is not on-hook, the "ready" LED indicator is energized at step 432 and the line is tested at step 434 to determine if it is on-hook. If the line is on-hook, the original power state (on or off) is restored at step 436 and the main processing loop is re-entered before step 262. If the modem has not answered (gone off-hook), 424, and the ringing limit has been reached at step 438, the "ready" LED indicator is set to off at step 440 and the original power state is restored at step 436. If, in the main processing loop 84, i t has been determined that the "PC power" button is down, step 272, the power-button-down subroutine 98 of FIG. 12 is begun, wherein the status of the PC power is determined, step 450, and the embodiment remote computer is turned on and the power LED activated, step 452 if the remote computer 54 is not currently on. If the remote computer 54 is already on, it is turned off and the power LED indicator is deactivated, step 454. Thereafter, the status of the "PC power" button is determined, step 456 and the main processing loop 84 re-entered before step 262 when the "PC power" button is released.

Modifications and substitutions of the solely exemplary embodiment of the present invention, discussed in detail above as made by one of ordinary skill in the art, are considered to be within the scope of the present invention, which is not to be limited except by the claims which follow. Furthermore, the detailed implementation of the present invention, such as causing a particular signal to be created or processed in the described hardware in response to the command or program control illustrated by the above discussed program process steps or in the protocol diagram of FIG. 13, can be provided by one of ordinary skill in the art.

What is claimed is:

1. For use with a computer having a modem for providing data transfer over a telephone line medium, apparatus for providing file data transfer comprising:
   means responsive to a telephone line ring signal providing an answer mode after a selected number of rings and providing a telephone line connection in said answer mode;
   means responsive to a password signal from said telephone line communication providing a control signal upon receipt of a selected password;
   means for providing power to said computer in response to said control signal; and
   means responsive to said control signal to provide a local ringing signal to said modem in response to said control signal, wherein
     said modem becomes operable to receive data via said telephone line connection, upon modem answer of said local ringing signal, and
     said computer is adapted to provide a local data file and enable a file data transfer upon receipt of a selected alphanumeric caller ID and password combination.

2. The apparatus of claim 1, wherein said means responsive to a password signal includes means to detect at least one of an interactive-mode and an automatic-mode password signal.

3. The apparatus of claim 2, wherein said means responsive to a password signal further includes at least one of means to determine a query state and means to determine a command state subsequent to detection of a valid interactive-mode password.

4. The apparatus of claim 3, wherein said means responsive to a password signal includes status reporting means responsive to a query state wherein a status signal is provided to said telephone line corresponding to a status condition of said means for providing power.

5. The apparatus of claim 3, wherein said means responsive to a password signal includes command responsive means providing said control signal in response to a corresponding command signal.

6. The apparatus of claim 1, wherein
said password signal is repeatedly transmitted to said means responsive to a password signal.

7. The apparatus of claim 1, further including
means responsive to the termination of data transfer for causing said means for providing power to said computer to deenergize said computer after a selected period subsequent to the conclusion data transfer, and including visual indicator means having a flash rate related to the time remaining in said selected period.

8. Apparatus for providing remote initiation of a data transfer with a local computer via a communications line, comprising:
means for sensing a ringing signal on communication line;
means responsive to said sensed ringing signal for providing an answer condition after a selected number of rings wherein the ringing signal terminates and said communication line is in condition to transfer data thereon;
a password decoder for providing an enable signal upon receipt of a selected password comprising a first data sequence;
a local ringing signal generated for providing a local ringing signal to said local computer in response to said enable signal; and
a power switch adapted to cause said local computer to become powered in response to said enable signal, wherein
said local computer includes means responsive to said local ringing signal for providing an answer condition,
said local ringing signal generator terminates said local ringing signal, when said means responsive to said local ringing signal answers so as to provide data transfer between said local computer and said communications line.

9. The apparatus of claim 8, further including means for selectively connecting at least one of a telephone, an automatic answering machine and said local computer modem.

10. The apparatus of claim 9, wherein said means for selectively connecting the computer modem interrupts the connection to said automatic answering machine upon detection of a valid password.

11. The apparatus of claim 10, further including off-hook detection means for detecting an off-hook condition of at least one of a telephone desk set connected to said input line and said local computer.

12. The apparatus of claim 11, further including means for denying the computer modem access to the line for an outgoing call upon the detection of said off-hook condition.

13. A method of providing data transfer between a local computer and a remote computer, comprising the steps of:
establishing communications between said local computer and a remote computer control unit;
transmitting a selected password from said local computer to said remote computer control unit;
providing power to said remote computer upon receipt of said selected password;
providing a local ringing signal to said remote computer from said remote computer control unit;
answering said local ringing signal;
executing a selected program in said remote computer to service said communications between said local computer and said remote computer upon answer of local ringing signal;
respectively providing a selected alphanumeric ID password from said local computer after a carrier link is established and a prompt is issued by said remote computer; and
providing a transfer of data between said local computer and said remote computer.

14. The method of claim 13, wherein the step of establishing comprises
providing a telephone line connection between modem associated with said local computer and said remote computer control unit.

15. The method of claim 13, further including the steps of:
providing connection to a telephone unit and an automatic answering machine prior to receipt of said selected password; and disconnecting said answering machine upon receipt of said selected password.

16. The method of claim 13, further including the step of transmitting a ringback signal to said local computer from said remote computer control unit upon receipt of said selected password.

17. The method of claim 16, further including the step of executing a program in said local computer to provide said selected alphanumeric password in response to said prompt issued by said remote computer.

18. A method of determining the status of a remotely located computer via a communication link, comprising the steps of:
establishing communications with a remotely located computer control unit via said communications link;
signalling said remotely located computer control unit with a selected password;
signalling said remotely located computer control unit with a selected inquiry code; and
returning a status signal in response to said selected inquiry code by said remotely located computer control unit,
wherein the step of signaling comprises the step of signaling an interactive-mode password comprising on of a status and a command.

19. The method of claim 18, wherein the step of establishing comprises the step of providing a telephone connection by manually dialing the telephone number associated with said remote computer and the corresponding control unit.

20. The method of claim 18, further including the step of providing the status of one of said remote computer and said remote computer control unit.

21. The method of claim 18, further including the step of obtaining the state of one of said remote computer and said remote computer control unit.

22. A signalling protocol for establishing a data route between a data sender and a data receiver via a communication path, comprising the steps of:
provided a ringing signal from a first one of said data sender and said data receiver to a second one of said data sender and said data receiver;
answering said ringing signal by said second one of said data sender and said data receiver;
sending a selected password from said first one to said second one;
responding to said selected password by a control unit at said second one by generating a ringing signal voltage and by sending an audible ringback signal to said first one;
answering said ringing signal at said second one;
sending an identification request prompt from said second one to said first one;
responding to said prompt with a selected alphanumeric ID and password combination sent by said first one; and
transferring data between said first one and said second one of said data sender and said data source.

23. A method of providing selective signal transfer of data between a first and second computer, comprising the steps of:
operating said first computer according to a data transfer initiate program;
operating said second computer according to a data transfer response program; and
installing a programmed controller between said first and second computers, wherein
said programmed controller is responsive to signals provided by said first computer produced by said data initiate program, and
said programmed controller provides access control in response to said signals produced by said data transfer initiate program by sending selective signals and power control to said second computer.

24. The method of claim 23, wherein
said data transfer initiate program causes said first computer to send a selected DTMF password and a selected alphanumeric ID and password combination to said second computer; and
said programmed controller provides said selected alphanumeric ID and password combination to said second computer subsequent to receipt of said selected DTMF password.

25. The method of claim 23, wherein the step of operating according to said data transfer initiate program includes the step of transferring one of current screen buffer and stored file data to said second computer.

26. The method of claim 23, wherein the step of operating according to said data transfer initiate program includes the step of receiving data files from said second computer and storing said received data files in said first computer.

27. The method of claim 23, wherein the step of operating according to said data transfer response program includes the step of receiving data files from said first computer and storing said data files in said second computer.

28. The method of claim 27, wherein the step of receiving data files from said first computer includes the step of
suspending operation of any currently executing program in said second computer;
temporarily storing the parameters of said currently executing program prior to storing said received data files; and
restoring operation of said currently executing program according to said temporarily stored parameters upon completion of receiving and storing said data files.

29. The method of claim 23, wherein the step of operating according to said data transfer response program includes the step of transferring one of current screen buffer and stored data to said second computer.

30. For use with a computer having a modem for providing data transfer over a telephone line medium, apparatus for providing file data transfer comprising:
means responsive to a telephone line ring signal providing an answer mode after a selected number of rings and providing a telephone line connection in said answer mode;
means responsive to a password signal from said telephone line communication providing a control signal upon receipt of a selected password; and
means responsive to said control signal to provide a local ringing signal to said modem in response to said control signal, wherein
said modem becomes operable to receive data via said telephone line connection, upon modem answer of said local ringing signal, and
said computer is adapted to provide a local data file and enable a file data transfer upon receipt of a selected alphanumeric ID and password combination.

31. For use with a stored program computer having a modem for providing data transfer over a telephone line medium, apparatus for providing data transfer, comprising:
means for providing a ring signal to said modem said ring signal having a cadence selectable according to a plurality of data transfer modes, wherein said cadence comprises selected durations of AC ring voltages present and absent; and
means responsive to said cadence for providing computer control of data transfer according to said cadence.

32. The apparatus of claim 31, wherein said means responsive to said cadence comprises a stored computer program control means resident in said computer.

33. The apparatus of claim 32, wherein
detection of a first cadence by said means responsive to a cadence provides data file transfer between said computer and said telephone line, and
detection of a second cadence by said means responsive to a cadence provides a transfer of computer program control in said computer.

* * * * *